United States Patent [19]

Gotcher

[11] Patent Number: 4,575,705
[45] Date of Patent: Mar. 11, 1986

[54] TEMPERATURE PROBE

[75] Inventor: Ricky G. Gotcher, Taylor, Tex.

[73] Assignee: Weed Instrument Co., Inc., Round Rock, Tex.

[21] Appl. No.: 581,426

[22] Filed: Feb. 17, 1984

[51] Int. Cl.[4] .............................................. H01C 3/04
[52] U.S. Cl. ..................................... 338/28; 338/229; 374/183; 374/208
[58] Field of Search ................... 338/28, 229; 374/153, 374/179, 183, 165, 208, 209; 136/230, 231

[56] References Cited

U.S. PATENT DOCUMENTS

| | | | |
|---|---|---|---|
| 2,414,370 | 1/1947 | Floyd | 374/179 |
| 2,588,014 | 3/1952 | Knudsen | 338/28 |
| 2,798,893 | 7/1957 | Winkler | 374/179 |
| 2,981,109 | 4/1961 | Knudsen | 338/28 |
| 3,159,032 | 12/1964 | Rademacher et al. | 136/231 |
| 3,237,139 | 2/1966 | Werner | 338/28 X |
| 3,436,713 | 4/1969 | Di Noia | 338/28 |
| 3,497,854 | 2/1970 | Yonkers | 338/28 |
| 4,243,968 | 1/1981 | Scott | 338/28 |
| 4,420,738 | 12/1983 | Rehmann et al. | 374/209 X |
| 4,467,134 | 8/1984 | Pastell | 136/231 |

FOREIGN PATENT DOCUMENTS

| | | | |
|---|---|---|---|
| 62936 | 10/1982 | European Pat. Off. | 338/28 |
| 57-201826 | 12/1982 | Japan | 338/28 |
| 737793 | 6/1980 | U.S.S.R. | 374/165 |

Primary Examiner—C. L. Albritton
Assistant Examiner—M. M. Lateef
Attorney, Agent, or Firm—Arnold, White & Durkee

[57] ABSTRACT

There is provided a temperature probe for measuring the temperature of the probe's surroundings and including a tip casing having an interior casing cavity in fluid communication with the probe's surroundings and at least one interior wall cavity located with respect to the interior casing cavity to facilitate heat transfer between the two cavities. A sensor such as a resistance temperature detector is mounted in the interior wall cavity and surrounded by sufficient packing to electrically insulate the sensor from the tip casing wall. A support casing is mated to one end of the tip casing with at least that portion of the support casing adjacent to the tip casing having an effective thermal conductivity lower than that of the tip casing. A heat dissipation mechanism such as a plurality of fins attached to the support casing may also be provided to limit heat transfer down the length of the support casing from the tip casing.

19 Claims, 3 Drawing Figures

TEMPERATURE PROBE

BACKGROUND OF THE INVENTION

There is provided an improved apparatus for measuring temperature and more particularly an improved temperature probe having a generally improved response time in measuring the temperature of the probe's surroundings.

Numerous devices are employed to measure temperature in industrial and other settings. Resistance thermometers or temperature detectors have been used in many industrial applications. A resistance thermometer depends upon the variation of the electrical resistance of a wire with temperature. Most metals become more resistant to the passage of an electrical current as they become hotter. The increase in resistance is generally proportional to the rise in temperature. Thus, a constant current passed through a metal of varying resistance produces a variation in voltage that is proportional to the temperature change.

In many cases, resistance temperature detectors or devices must be designed and constructed to be shock resistant. For example, many resistance temperature detectors employ a sensing element in the form of a platinum wire having a very small diameter. The platinum wire is wound around a ceramic or glass mandrel or other support to form a sensing element. The wire is secured by coating the wire and the mandrel or support with a refractory cement or glass.

The sensing element is placed in contact with a signal conditioner by use of three or four lead wires, which are fused to the sensing element. The sensing element is then inserted inside a piece of hollow cylindrical metal tubing or casing, which is normally made of stainless steel. The space between the interior walls of the hollow cylindrical metal tubing and the sensing element is generally filled with a compacted refractory powder such as magnesium oxide or a ceramic cement to prevent damage to the sensor due to vibration and otherwise secure the sensing element.

The patent literature discloses a variety of temperature measuring devices. MacKenzie et al, U.S. Pat. No. 4,087,775 is illustrative here. According to that disclosure, there is provided a temperature measuring probe utilizing a resistance temperature detector element and a mode of assembling the element in a reliable manner against shock and vibration. More particularly, according to that disclosure, there is provided a commercial resistance temperature detector element including a solid insulating mandrel upon which a helical winding of suitable resistance wire is wound. The winding is encased in glass fused in place or fired ceramic and the terminal ends of each winding are brought out for connection to a suitable circuit. The resistance temperature detector is supported in a metallic sheath made of stainless steel. The element is supported in and insulated with respect to the sheath by means of a firmly compacted mass of a pulverized or refractory material such as magnesium oxide. The terminal leads of the element and the pulverized refractory material are leveled adjacent one end of the sheath, as by counterboring, to provide a chamber to house the connections between the terminal leads of the resistance temperature detector element as conductors. The resulting chamber has an interior portion of the sheath as its lateral wall. A bore is then drilled on the principal axis of the sheath of such length and diameter as to receive the sensing element with a comfortable fit yet loose enough to allow placement of an adequate layer of cement. After insertion of the element into the bore and curing of the ceramic cement, conductors are welded to the terminal leads to connect the resistance temperature detector element with the appropriate measuring devices.

Chambers, U.S. Pat. No. 3,267,733 is further illustrative of resistance thermometers disclosed in the patent literature. According to that disclosure, an elongated resistive element in the form of an interwound spiral is encapsulated and supported in an oxide encapsulation having a temperature coefficient of resistance which changes with temperature in such a manner as to compensate for changes in the temperature coefficient of resistance of the elongated resistive element. The oxide encapsulation is supported with a refractive metal or ceramic tube, which in turn is suitably secured to a sleeve. Wires connecting to the elongated resistive element pass through the sleeve 12, where they are supported by a pure beryllium oxide insulation.

Another device is disclosed in Werner et al, U.S. Pat. No. 3,114,125, wherein a resistant temperature detector probe is described. It is understood that the tip of the probe has a hollow interior. A helix of temperature sensitive wire is cemented to the inside walls of the tube with only about one-half of the diameter of the wire being contained in the cement. The turns of the wire are allowed to be free standing in air or gas within the hollowed center of the casing. It is understood that the spacing of the turns can be critical, since numerous turns may be required to gain acceptable resistance levels.

Beaudoin et al, U.S. Pat. No. 4,011,654 discloses an exhaust gas sensor probe. According to that disclosure, a tube of ceramic material is arranged to support a resistive type ceramic sensor. The tube is provided with a generally continuous groove around the portion of its exterior to support a heater wire in close heat conductive relation to the sensor. A housing sleeve is provided with a plurality of fin members. The fin members provide for radiation of heat energy to protect the electrical terminals while providing a convenient mechanism to control the depth of penetration of the probe within an associated exhaust system so that the sensor will be properly positioned at the approximate center of the associated exhaust gas conduit.

The following patents are further illustrative of other temperature sensing devices: Picciano, U.S. Pat. No. 2,379,317; and Micheli et al, U.S. Pat. No. 3,896,409.

These and other prior temperature sensing devices and temperature probes suffer from one or more defects or limitations. For example, many of the probes have a delayed response to a step change in temperature. This is sometimes due to the high thermal mass of the probe or the low thermal conductivity of the medium between the sensor and the process temperature to be measured or both. This may also be caused by a failure to reduce heat transfer to certain parts of the probe.

Other devices are too fragile in construction to provide sufficient ruggedness. For example, the device may fail or, after several months exposure to a process stream, suffer an unacceptable reduction in response time.

Still other probes are designed such that probe seals have a reduced life expectancy, thus requiring more expensive seals or their frequent replacement. Further, a failure of the seal may lead to low insulation resistance from moisture penetration and a loss of accuracy. The failure of the seals is often caused by conduction of heat from the temperature probe. Such heat conduction can also cause failure of wire insulation, thus leading to undesirable results. These and other defects or limitations are substantially minimized if not eliminated by the present invention.

SUMMARY OF THE INVENTION

There is provided a temperature probe for measuring the temperature of the probe's surroundings. A hollow thermally conductive tip portion having a hollow interior portion forms one end of the probe. The other end of the probe is formed by a support portion. The body of the tip portion also defines a cavity. The cavity is positioned between the hollow interior of the tip portion and the exterior of the tip portion. A sensor, including a temperature sensing element, is positioned in the cavity. A refractory packing material in the cavity electrically insulates the sensor from the body of the tip portion. The body of the tip portion may further define at least one passageway for fluid communication between the hollow interior of the tip portion and the exterior of the tip portion.

In another embodiment, the tip of the probe is provided with a tip casing having an interior casing cavity. The interior casing cavity is in thermal communication with the probe's surroundings such as a fluid stream or the like as by means of perforations or holes in the wall of the casing. The tip casing has at least one interior wall cavity located with respect to the interior casing cavity so as to facilitate heat transfer between the two cavities. A sensor is mounted in the interior wall cavity and surrounded by sufficient packing to electrically insulate the sensor from the tip casing wall. The sensor generally includes a temperature sensing element. A contact is also provided to place the sensor in communication with a measuring device, which measures the sensing elements response to changes in temperature of the probe's surroundings. A support casing is mated to one end of the tip of the probe or tip casing. At least that portion of the support casing adjacent or closest to the tip casing has an effective thermal conductivity lower than that of the tip casing.

In one embodiment, the support casing is equipped with a heat exchanger such as one or more fins configured to facilitate heat transfer from the support casing to a heat sink, such as the ambient air. If a seal is mounted on, around or in proximity of the support casing, the fins may be located at a point near the seal and between the tip casing and the seal.

In another embodiment, the contact for placing the sensor in communication with the measuring device includes one or more elements, such as wires or leads, connected at one end to the sensor and at the other end to the measuring device. The interior of the tip casing is provided with a void volume between the interior casing cavity and the support casing. The void volume is configured to facilitate connection of the measuring device with the sensor by one or more of the elements. For example, where the support casing has a conduit passing through the support casing to facilitate routing of electrical wires through the support casing, the void volume can improve ease of assembly, and be subsequently packed with an electrical insulating packing material.

In yet another embodiment, the tip casing wall may be equipped with a plurality of holes for placing the interior casing cavity in fluid communication with the probe's surroundings. The number and arrangement of the holes is preferably balanced to facilitate the flow of fluid medium through at least a portion of the interior casing cavity while minimizing vibrations caused to the tip casing by the flow of fluid medium. The interior casing cavity, the tip casing and the portion of the support casing exposed to a surrounding fluid medium are all preferably balanced in size, design and weight to provide sufficient strength along the probe to resist breakage of the probe, while providing sufficient exposure to the fluid medium to facilitate operation of the sensor.

In a more detailed embodiment there is provided a temperature probe for measuring the temperature of the probe's surroundings. A metallic tip casing is provided with an interior casing cavity, which cavity is in fluid communication with the probe's surroundings. The tip casing has one or more heat conductive walls made up of a material having a high heat conductivity. The heat conductive walls have an exterior surface in heat exchange relation with the probe's surroundings, an interior surface in heat exchange relation with the interior cavity and an interior wall cavity at least a portion of which extends between the interior and exterior heat conductive wall surfaces. Generally, the exterior surface of the conductive walls preferably is exposed directly to the fluid or area to be measured. A sensor is mounted in the interior wall cavity and surrounded by packing. The packing is made of an electrical insulating material and is configured to electrically insulate the sensor from the surrounding interior wall cavity and hold the sensor in place in the interior wall cavity. The sensor is made of a substrate and a temperature sensing element mounted on the substrate. A contact is also provided for placing the sensor in electrical communication with a signal conditioner. A support casing is mated to one end of the tip casing. At least that portion of the support casing adjacent the tip casing is made of a material having a thermal conductivity lower than the thermal conductivity of the heat conductive walls of the tip casing.

In one embodiment, the tip casing is made of nickel metal and is in the shape of a generally elongated cylinder. The sensor includes a generally elongated support such as a mandrel around which is wound a platinum wire. The support casing is made of stainless steel and has an interior sheath which accommodates two or more lead wires which are attached at one end to the sensor and at the other end to measuring device.

In another embodiment, the tip casing has a plurality of transverse holes to facilitate fluid communication between the casing cavity and the probe's surroundings.

There follows a detailed description of the present inventive apparatus in conjunction with the foregoing drawings. This description is to be taken by way of illustration rather than limitation.

DETAILED DESCRIPTION

Figure 1:
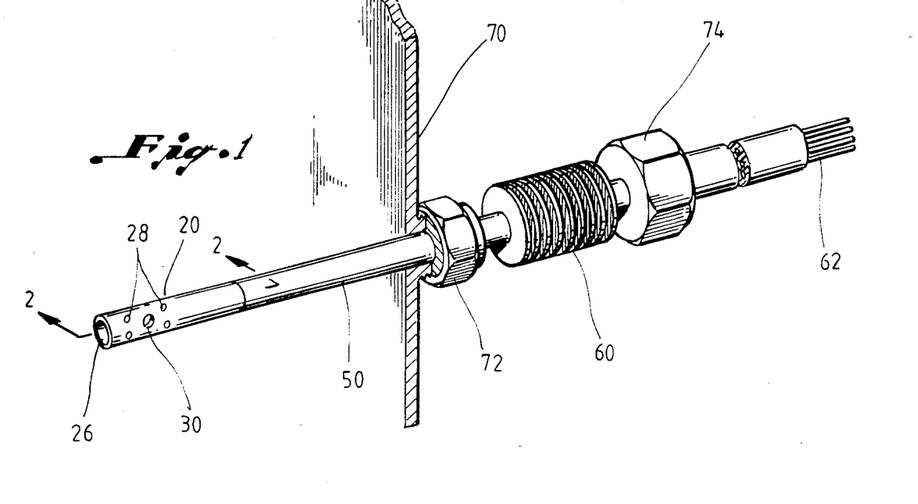
FIG. 1 is a schematic view of one embodiment of the present invention.
Figure 2:
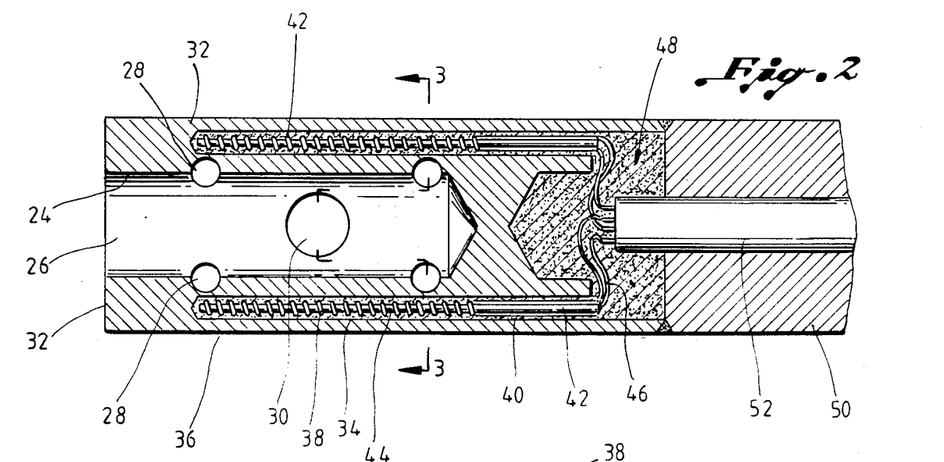
FIG. 2 is a cross-sectional view of the embodiment shown in FIG. 1 and taken along line 2—2.
Figure 3:
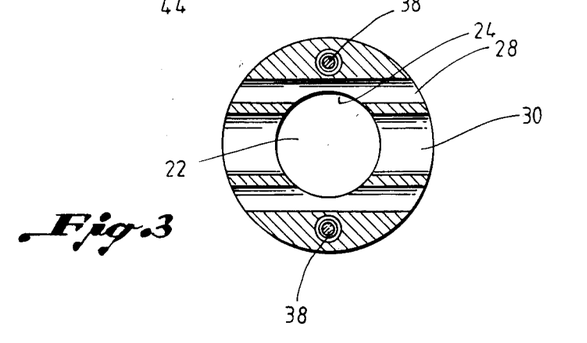
FIG. 3 is a cross-sectional view of the embodiment of the invention taken along line 3—3.

Referring generally to FIGS. 1-3, there is shown an embodiment of the present invention. Referring generally to those figures, a tip casing such as cylindrical metal casing 20 provides a temperature sensitive tip for the temperature probe. A support casing such as cylindrical metal casing 50 forms the remainder of the temperature probe including the stem. The tip casing is generally made of metal or other material which provides strength and has a high thermal conductivity. By way of example, the tip casing may be made of nickel.

The tip casing has an interior casing cavity such as cavity 22. The interior casing cavity is in thermal communication with the probe's surroundings. This is preferably accomplished by placing the interior surface 24 of the interior casing cavity such as casing 22 in fluid communication with the temperature probe's surroundings. As indicated in the drawings, this may be accomplished by having interior casing cavity such as cavity 22 end in an opening or aperture such as opening or aperture 26.

Fluid communication between the interior casing cavity and the temperature probe's surroundings may be further enhanced by the provision of further openings such as transverse holes or passages such as passages 28 and 30. Such holes or openings may be employed whether or not the interior casing cavity is completely or partially hollow or evacuated so as to expose the interior surface 24 of the interior casing cavity to the fluid surroundings of the probe. If the interior casing cavity is partially or completely filled with another material, such material generally should have preferably at least as high a thermal conductivity as the tip casing walls and may be provided to provide additional strength to the tip casing.

The size of the interior casing cavity such as cavity 22 and the remaining mass of the tip casing including any packing as well as any portion of the support casing exposed to the fluid surroundings to be measured are balanced to insure or maintain sufficient strength along the probe to resist breakage of the probe, while still providing sufficient exposure to the fluid surroundings to facilitate operation of the temperature probe. By way of example, the number and arrangement of the openings to the interior casing cavity such as transverse holes 28 and 30 may be balanced to facilitate the flow of a fluid medium from fluid surroundings through at least a portion of the interior casing cavity while minimizing vibrations caused to the tip casing by the flow of fluid medium through or over and around the tip casing and support casing.

The tip casing walls such as walls 32 are equipped with interior wall cavities such as generally cylindrical wall cavities 34. The interior wall cavity or cavities are located with respect to the interior casing cavity so as to facilitate heat transfer between the two cavities. By way of example, as shown in the drawings, the interior wall cavities such as generally cylindrical wall cavities 34 may share a common wall with the interior casing cavities such as cavity 22 for at least a portion of its length. Preferably, the interior wall cavity such as generally cylindrical wall cavity 34 is located close to the exterior wall surface 36 of tip casing walls such as walls 32. As such exterior wall surface 36 is in direct heat exchange relation with the probe's surroundings. The minimal distance between the exterior wall surface and interior wall cavity offers reduced resistance to heat transfer and facilitates heat transfer into the interior wall cavity. Further, at least a portion of the interior wall cavity preferably extends between the interior surface 24 of the interior casing cavity such as cavity 22 and the exterior wall surface such as surface 36 of walls 32. As the interior wall cavity such as generally cylindrical cavity 34 is in close thermal contact with the exterior wall surface such as surface 36 and the interior surface such as surface 24 of cavity 22, the transfer of heat from the temperature probe's surroundings is thus facilitated.

A sensor such as sensor 38 is mounted in the interior wall cavity such as generally cylindrical wall cavity 34. The sensor is supported and electrically insulated from the tip casing walls such as walls 32. This is preferably accomplished by means of a packing such as refractory packing material 40. The thickness of the packing should be generally sufficient to provide support and electrical insulation for the sensor, while not being so thick or having such a thermal conductivity as to substantially hinder the transfer of heat to the sensor such as sensor 38. By way of example, the packing may comprise high temperature refractory cement exhibiting properties of good thermal conductivity and high electrical resistance. Such a cement aids in proofing against vibration and shock and electrically insulates the sensor. Ultimately, the packing may be any of a variety of materials, all as would be known to one skilled in the art having the benefit of this disclosure.

The sensor such as sensor 38 may include a temperature sensing element such as coiled wire 42. The temperature sensing element will generally be mounted on a support or substrate such as elongated support 44. By way of example, the sensor may include one or more platinum wires coiled around an alumina substrate or support. A variety of other sensors including different substrates or temperature sensing elements may be used to advantage in the present invention, all as would be known to one skilled in the art having the benefit of this disclosure.

A contact is provided for placing the sensor in communication with a measuring device for measuring the sensing elements response to changes in temperature in the probe's surroundings such as would be caused in a change in a surrounding fluid. For example, a contact such as wires 46 could be employed with one end connected to the sensor such as sensor 38 and the other end being connected to other wires or an appropriate measuring device such as a signal conditioner.

The tip casing such as cylindrical metal casing 20 is also generally preferably equipped with an interior void volume such as hollowed out volume 48. Such a void volume can serve not only to facilitate placing of the contact such as wires 46 with respect to the sensor such as sensor 38, but can also accommodate an insulating material which can either electrically or thermally insulate the contact such as wires 46 or both. By way of example, a high temperature refractory cement which can be employed in the interior wall cavity such as generally cylindrical wall cavities 34 may also be used to fill in the initially hollowed out volume 48 after the contact, such as wires 46, is set in place, thus serving to electrically insulate the contact such as wires 46 and so help to insure better performance of the temperature probe.

A support casing such as cylindrical metal casing 50 is integrally attached to the tip casing such as cylindrical metal casing 20. This may be accomplished in a variety of ways such as by welding or by other methods as would be known to one skilled in the art having the benefit of this disclosure. In any event, the connection between the support casing and the tip casing should be such as to minimize chances of breakage of the probe and provide sufficient support between the support casing and the tip casing for the particular configuration of the tip casing. This balancing may be accomplished by variation in size, structure and materials of the various parts, all as would be known to one skilled in the art having the benefit of this disclosure.

The support casing should serve as a partial thermal barrier in order to enhance the overall performance of the probe. At least that portion of the support casing adjacent to the tip casing preferably should have an effective thermal conductivity lower than that of the tip casing. By way of example, the support casing such as cylindrical metal casing 50 may be made up of a metal having a lower thermal conductivity then the metal in cylindrical metal casing 20. Thus, the support casing 50 may be made of stainless steel, while the cylindrical metal casing 20 may be made of nickel. Alternately, it may be possible to reduce that portion of the support casing which is integrally mounted to and in direct contact with the tip casing. Alternately, the support casing can comprise two types of material, one of which forms at least a substantial portion of the support casing adjacent the tip casing, thus reducing the overall thermal conductivity of that portion of the support casing adjacent to the tip casing. However, it is believed preferable to provide a support casing made up largely or entirely of metal such as cylindrical casing 50 in order to provide sufficient overall strength to the probe, particularly when openings such as transverse holes 28 and 30 are employed to place the interior casing cavity in fluid communication with the temperature probe's surroundings.

The support casing 50 is equipped with a support casing cavity such as defined by elongated passageway 52. The supporting casing cavity serves to facilitate communication between the sensor and the measuring device for measuring the sensing elements response to changes in temperature of the probe's surroundings. For example, as indicated by the drawings, the support casing cavity can be defined by elongated passage 52 through which a contact such as wires 46 are passed. Ultimately, separate sensing element wires or various electrical elements could be employed in the supporting casing cavity such as defined by elongated passageway 52, such elements being, in turn, hooked up to wires 46. Ultimately, other forms of contacts could be employed, all as would be known to one skilled in the art having the benefit of this disclosure.

As shown in FIG. 1, the support casing can be further equipped with a heat dissipation mechanism such as fins 60 which facilitates transfer of heat to a heat sink such as ambient or flowing air or a fluid conduit in heat exchange relation with the heat dissipation mechanism. The presence of a heat dissipation mechanism reduces the amount of heat traveling along at least part of the support casing. This, in turn, reduces the temperature of various items which are in thermal contact with the support casing, particularly where they are located downstream of the heat dissipation mechanism. For example, as shown in FIG. 1, where a seal, such as probe seal 74, is employed at the end of the support casing, a heat dissipation mechanism such as fins 60 may be located at a point near the seal and between the tip casing and the seal, thus reducing the overall average temperature to which the seal is exposed. This, in turn, can result in improved longevity of the seal. This can be so even in cases where the heat dissipation mechanism such as fins 60 may be exposed to relatively high temperatures at periodic intervals for short periods of time. As a result, the probe seal is less likely to degrade and will generally have a longer useful life. This, in turn, reduces the chances for moisture or other contaminants to enter the support and tip casings, thus improving overall life and reliability of the temperature probe. Additionally, the use of a heat dissipation mechanism also reduces thermal stress on other elements such as wires or leads 62. The presence of the heat dissipation mechanism may also allow a reduction of insulation required.

The heat dissipation mechanism may take on any of a variety of forms as would be known to one skilled in the art having the benefit of this disclosure. By way of example, as indicated in drawings, the heat dissipation mechanism may include a plurality of fins 60. Such fins may be made of a variety of materials such as stainless steel or the like.

As indicated, the heat dissipation mechanism is preferably located at a point outside of the surroundings to be measured. For example, as shown in FIG. 3, the fins 60 are located on the side of wall 70 and stop 72 opposite from the tip casing 20.

Referring to the specific embodiment generally depicted in the drawings and described as illustrative above, use of one or more ruggedized sensors such as platinum sensing elements inside a probe wall can result in several advantages as compared to prior devices, including those which placed the sensing element between the walls of a tube. Since this sensing element is located within the wall of the probe, the speed of response to a temperature change is enhanced due to the generally higher surface to mass ratio provided. This, in turn, favorably affects response time. Further, since the element is located within the wall of the probe, the inside of the probe may be left open to the probe's surroundings and where fluid flow is involved, flow through the various openings such as transverse holes 28 and 30 may further insure that the inside of the probe and hence the sensor more constantly reflects the surrounding temperature. Thus, the sensor receives heat transfer from both internal and external probe surfaces. This stands in contrast to conventional temperature probe designs, which do not allow internal process heat transfer and have additional internal mass to resist and delay transfer of heat to the temperature sensitive material.

The use of a support casing having an overall lower thermal conductivity further enhances performance of the sensor as well as the overall performance of the temperature probe. The support casing in conjunction with the heat dissipation mechanism such as fins 60, serves to reduce the transfer of heat along the support casing and away from the tip casing. For example, as illustrated with respect to the drawings, the use of cooling fins 60 along with a cylindrical metal casing 50 with a lower thermal conductivity serves to reduce or minimize stem conduction of heat which might degrade the probe seal 74 and insulation around wires or leads 62.

The dimensions of the tip casing and openings such as transverse holes 28 and 30 as well as other portions of a probe, according to this invention, may be varied. For example, it is believed that, depending upon the dimensions and configuration of other portions of the probe, the length of the tip casing may vary from approximately 0.5 inches to 2 to 3 inches or more depending upon the application and the response time desired. Similarly, the outside diameter of the tip casing may be ⅜ inch or more depending upon the application and the response time desired. The diameter, as well as the configuration and number of the transverse holes, may also be varied. For example, the angular orientation of the transverse holes may be between about 30–45° with the radial horizontal center line of the tip casing.

A number of variations in the foregoing may be employed, all as would be known to one skilled in the art having the benefit of this disclosure. For example, the number and size of the cooling fins 62 may be modified as necessary depending on probe configuration and process temperatures to be measured. Also, the diameter of the support casing may be varied along its length. Additionally, a varying number of interior wall cavities such as generally cylindrical wall cavities 34 may be employed. The number of sensors can also be varied, although the number of sensors is generally preferably kept to a minimum, since this normally facilitates accurate measurement depending on the measuring devices employed. Further, there need not be a one to one correspondence between the number of sensors and the number of interior wall cavities. This, in turn, can facilitate installation of the sensors into the interior wall cavities.

The following examples serve to further highlight the description of the invention. They are provided by way of illustration rather than limitation.

EXAMPLES

A series of plunge and loop current tests were performed with the results generally described in Examples 1–5 below. The tests and calculations were made on behalf of the Applicant by Analysis & Measurement Services, 4706 Papermill Road, Knoxville, Tenn. 37919.

EXAMPLE 1

A prototype temperature probe was constructed generally along the lines of the temperature probe described above in conjunction with the drawings. The probe included a cylindrical metal tip casing. The tip casing had a hollow end section with holes through an annular section near the tip of the probe. One relatively larger transverse hole was provided along with four smaller transverse holes in the general configuration shown in the drawings. A sensor, including a platinum wire mounted on an elongated alumina substrate, was inserted into a cavity in the probe wall. The cylindrical metal support casing made of stainless steel was welded to the cylindrical tip casing. The tip casing was made of nickel. The four smaller transverse holes were at an angle of 45° to the radial horizontal center line of the tip casing. A refractory cement was used to insulate the sensor and the probe had an ice point resistance of approximately 200 ohms.

The approximate design dimensions of certain portions of the prototype are set out in Table 1.

TABLE 1

| Probe Dimensions for Examples 1 and 5 | | |
|---|---|---|
| | Prototype Used in Example 1 | Prototype Used in Example 5 |
| Length of tip casing | 1.125 | 1.175 |
| Outside diameter of tip casing | 0.375 | 0.375 |
| Outside diameter of tip support casing at juncture with tip casing | 0.375 | 0.375 |
| Inside diameter of interior casing cavity | 0.213 | .312 to .159 |
| Distance of center of smaller transverse holes from end of tiping | 0.2; 0.6 | .28; .575 |
| Distance of center of larger transverse hole from end of tip casing | 0.4 | .43 |
| Diameter of smaller transverse holes | .0935 | .111 |
| Diameter of larger transverse hole | .185 | .159 |
| Inside diameter of cylindrical wall cavities | .062 | .082 |
| Distance from end of cylindrical wall cavity farthest from support casing to end of tip casing farthest from support casing | .19 | .175 |
| Minimum distance between interior casing cavity and hollowed out volume 48 | .07 | .07 |
| Length of cylindrical wall cavity from juncture with hollowed out volume such as hollowed out volume 48 in drawings to the end of the cylindrical wall cavity | 0.75 | 0.75 |

Plunge tests were conducted on the prototype to obtain a time constant. The speed of response of resistance temperature probe is usually described in terms of a time constant. The time constant is defined as the time required for a sensor output to reach 63.2 percent of its final value following a step change in surrounding temperature. This time constant can be measured by a plunge test or a loop current step response tests. The former is discussed in this Example while the latter is discussed in Example 3.

A classical experiment for measuring the time constant of a resistance thermometer involves sudden immersion of the sensor from one medium at some fixed temperature into another environment with a different temperature. This step change in temperature results in a response transient from which the sensor time constant can be measured. This experiment is usually called a plunge test. The time constant may be referred to as the plunge test time constant. Plunge tests were performed on the prototype from warm air into a rotating tank with room temperature water flowing at 3 feet per second. The advantage of testing in room temperature water instead of at an elevated temperature is that there is no problem in ensuring a constant temperature bath.

A rotating cylindrical tank was partially filled with water and rotated to provide flowing water for sensor testing. Flow velocity was chosen by selecting radial position in the tank. A solenoid-controlled pneumatic cylinder was used to drive the prototype into and out of the water in the tank. A timing signal indicated the approximate moment the prototype touched the water surface. The time constants of the prototype were measured by plunge tests in room temperature water at five different flow rates ranging from about 1 to about 6 feet per second. Three to four measurements were then made for each flow rate and then averaged to obtain a time constant for each flow rate. The results are shown in Table 2.

TABLE 2

| Run No. | Water Temperature | Flow Rate (Feet per Second) | Measured Time Constant (Seconds) | Averaged Time Constant (Seconds) |
|---|---|---|---|---|
| 1 | 70° F. | 1.167 | 1, 1, .97 | .99 |
| 2 | " | 2.26 | .76, .74, .76 | .75 |
| 3 | " | 3.0 | .68, .64, .66, .72 | .68 |
| 4 | " | 3.87 | .67, .66, .66 | .67 |
| 5 | " | 5.8 | .60, .616, .6, .612 | .67 |

EXAMPLE 2

A time constant can be calculated from the following general equation:

$$t = C1 + (C2)(U)^{-0.6} \quad (1)$$

where
t = time constant,
C1, C2 = contants,
U = fluid flow rate in feed per second.
Using the data obtained in Example 1, C1 and C2 were evaluated, such that:

$$t = 0.34 + (0.70)(U)^{-0.6} \quad (2)$$

Taking into account the temperature dependence of surface effects, but ignoring the temperature dependence of the internal component of the time constant, C2 was calculated for water temperatures of 550° F., such that:

$$t = 0.34 + (0.39)(U)^{-0.6} \quad (3)$$

Time constants were then calculated at various flow rates for water temperatures of 70° F. and 550° F. The results are shown in Table 3.

TABLE 3

Time Constants Predicted for Prototype at Various Flow Rates and Two Different Temperatures Using Equations (2) and (3)

| Flow Rate (Ft./Sec.) | Time Constant 70° F. | (Sec.) 550° F. |
|---|---|---|
| 1 | 1.04 | 0.73 |
| 2 | 0.80 | 0.60 |
| 3 | 0.70 | 0.54 |
| 4 | 0.64 | 0.51 |
| 5 | 0.61 | 0.49 |
| 6 | 0.58 | 0.47 |
| 7 | 0.56 | 0.46 |
| 8 | 0.54 | 0.45 |
| 9 | 0.53 | 0.44 |
| 10 | 0.52 | 0.44 |
| 12 | 0.50 | 0.43 |
| 14 | 0.48 | 0.42 |
| 16 | 0.47 | 0.41 |
| 18 | 0.46 | 0.41 |
| 20 | 0.46 | 0.40 |
| 22 | 0.45 | 0.40 |
| 24 | 0.44 | 0.40 |
| 26 | 0.44 | 0.40 |
| 28 | 0.43 | 0.39 |
| 30 | 0.43 | 0.39 |
| 32 | 0.43 | 0.39 |
| 34 | 0.42 | 0.39 |
| 36 | 0.42 | 0.38 |
| 38 | 0.42 | 0.38 |
| 40 | 0.42 | 0.38 |
| 42 | 0.41 | 0.38 |

EXAMPLE 3

Using the procedure in Example 1 of measurements were made with the prototype of Example 1 installed in water with different angular orientations of the holes in the sensor relative to the direction of flow. Water temperature was 70° F. As a result, the time constant of the prototype varied between about 0.7 to 0.9 of a second depending on the angular orientation. An orientation, wherein the holes were generally in line with the flow of water, resulted in a time constant of 0.70, while an orientation, wherein the holes were generally perpendicular with the flow of water, resulted in a time constant of 0.90.

EXAMPLE 4

The prototype of Example 1 was used in Loop Current Step Response (LCSR) tests. An Analysis and Measurement Services ERT-1 Response Time Test Instrument was used along with an associated computer.

The LCSR test is said to allow remote testing of a temperature probe while it is exposed to normal operating conditions and without interference to the plant operation. The LCSR test is based on analysis of a temperature transient that results from a step change in electrical current through the sensing element of the sensor. A standard Wheatstone bridge with current switching capability may be used to perform the test. The current through the sensor is switched from a few milliamperes to a level of about 40 to about 80 milliamperes. The increased current produces Joule heating in the sensor and results in a temperature transient that settles out slightly above the temperature of the sensor surroundings.

It has been shown that this internal heating transient can be analyzed to give the time constant of the sensor. It is understood that experience with a number of different temperature probes has shown that agreement between the time constants from plunge and LCSR tests should be better than 10 percent.

LCSR tests were performed with the prototype of Example 1 installed in the flow loop with room temperature (70°F.) water flowing at 3 feet per second. The data were sampled and analyzed on a microcomputer. This resulted in a time constant of approximately 0.68, which compared favorably with the time constant obtained from plunge testing of the sensor in the flow loop at the same condition. The difference between the two time constants is small indicating that the LCSR method is applicable to the prototype used in Example 1.

The result of the tests and calculations set out in Examples 1–4 indicate that the prototype approaches a time constant of 0.38 second in water at a temperature of 550° F. and a flow rate of 40 feet per second. The agreement between plunge test results and loop current step response results was found to be about 3 percent indicating that the prototype is LCSR testable. Further, orientation of the holes on the prototype can affect the time constant. Installed temperature detectors of this design, with comparable quality of construction, should yield response characteristics similar to the prototype used in Example 1.

These results compare favorably with prior devices. It is believed that prior devices cannot provide such low time constants without sacrificing durability. Thus, it is understood that prior art probes having similar mass and weight may generally have time constants on the order of 3 to 5 seconds, as compared to 0.7 to 0.9 seconds shown in the examples. In contrast, it is understood that those probes which can approach the 0.7 to 0.9 second time constant sacrifice durability and ruggedness.

EXAMPLE 5

A second prototype was constructed along the same general lines as that of the prototype used in Example 1. However, the four transverse holes were at an angle of 30° to the radial horizontal center line of the tip casing. Further, the inside diameter of interior casing cavity varied from 0.312 at a point farthest from the support casing to 0.159 along that portion penetrated by the transverse holes. The approximate diameters along with other approximate design measurements are given in Table 1.

The second prototype was tested by the plunge method in a water bath at 65° F. Rate of flow was about 3 feet per second and reaction was measured from a temperature of 120° F. The plunge test was repeated three times, resulting in measurements of about 0.74, 0.728 and 0.724. These time constants were subsequently averaged. The resulting time constant was about 0.73 seconds.

Although the foregoing examples as well as a part of the foregoing discussion have been mainly directed to the use of generally cylindrical elongated temperature probes for use in measuring process fluids, it should be understood that the invention can also be used to advantage in a wide variety of applications where a temperature probe is used to measure the temperature of its surroundings. For example, it is believed that the surroundings may comprise any of a variety of fluid media including gases or liquids. Alternately, it is believed that the probe may be used to advantage where the surroundings are largely or partially made up of solids.

Further modifications and alternative embodiments of the inventive apparatus will be apparent to those skilled in art having the benefit of this disclosure. Accordingly, this description and the examples are to be construed as illustrative only and for the purpose of teaching those skilled in the art the manner of carrying out the invention according to the patent statutes. For example, equivalent materials may be substituted for those specifically illustrated and described herein and certain features of the invention may be utilized independently of the use of other features. All this would be apparent to one skilled in the art after having the benefit of this disclosure and this detailed description of the invention.

What is claimed is:

1. A temperature probe for measuring the temperature of the probe's surroundings comprising:
   a hollow thermally conductive tip portion having a hollow interior portion in fluid communication with the probe's surroundings and forming one end of the probe and the other end being formed from a support portion, the body of the tip portion also defining a sensor cavity which is positioned in an outer wall of the tip portion so as to be between the hollow interior of said tip portion and the exterior surface of said tip portion, said sensor cavity being out of fluid communication with the probe's surroundings;
   a sensor positioned within said sensor cavity, said sensor comprising a temperature sensing element; and
   a refractory packing material packed into the sensor cavity to electrically insulate the sensor from the body of the tip portion.

2. A temperature probe according to claim 1 wherein the body of said tip portion further defines at least one passageway for fluid communication between the hollow interior portion and the exterior surface of said tip portion.

3. A temperature probe according to claim 1 wherein the support portion has a lower thermal conductivity than the tip portion.

4. A temperature probe according to claim 3 wherein the tip portion is made of nickel and the support portion is made of stainless steel.

5. A temperature probe for measuring the temperature of the probe's surroundings comprising:
   a tip casing having an exterior wall, an interior casing cavity in thermal communication with the probe's surroundings and at least one interior wall cavity located within the exterior wall, the interior wall cavity being also located with respect to the interior casing cavity to facilitate heat transfer between the two cavities, said interior wall cavity being physically insulated from the probe's surroundings;
   a sensor mounted in the interior wall cavity and surrounded by sufficient packing to electrically insulate the sensor from the tip casing exterior wall, and physically secure the sensor to prohibit movement of the sensor relative to the interior wall cavity, said sensor comprising a temperature sensing element;
   a contact for placing the sensor in communication with a measuring device for measuring the sensing element's response to changes in temperature of the probe's surroundings; and
   a support casing mated to one end of the tip casing, at least that portion of the support casing adjacent the tip casing having an effective thermal conductivity lower than that of the tip casing.

6. A temperature probe according to claim 5 wherein the support casing is equipped with at least one fin configured to facilitate heat transfer from the support casing to a heat sink.

7. A temperature probe according to claim 6 wherein a seal is mounted on the support casing and the fins are located at a point near the seal and between the tip casing and the seal.

8. A temperature probe according to claim 5 wherein the contact for placing the sensor in communication with the measuring device comprises at least one element connected at one end to the sensor and at the other end to the measuring device and wherein the interior of the tip casing has a void volume opposite the interior casing cavity, said void volume being configured to facilitate connection of the measuring device and the sensor by at least said element.

9. A temperature probe according to claim 8 wherein the supporting casing has a conduit passing through the support casing, one end of the conduit opening on to the face of the support casing nearest the tip casing to facilitate routing of the elements.

10. A temperature probe according to claim 8 wherein the void volume is packed with an electrical insulating packing material.

11. A temperature probe according to claim 5 wherein the probe's surroundings comprise a fluid medium and the tip casing wall is equipped with a plurality of holes for placing the interior casing cavity in fluid communication with the fluid medium.

12. A temperature probe according to claim 11 wherein the number and arrangement of the holes is balanced to facilitate the flow of the fluid medium through at least a portion of the interior casing cavity while minimizing vibrations caused to the tip casing by the flow of the fluid medium.

13. A temperature probe according to claim 11 wherein the size of the interior casing cavity and the remaining mass of the tip casing and any portion of the support casing exposed to the fluid medium are balanced to ensure sufficient strength along the probe to resist breakage of the probe, while providing sufficient exposure to the fluid medium to facilitate operation of the sensor.

14. A temperature probe for measuring the temperature of the probe's surroundings comprising:
   a tip casing having an interior casing cavity in fluid communication with the probe's surroundings and one or more heat conductive walls comprising material having a high heat conductivity, said heat conductive walls having an exterior surface in heat exchange relation with the probe's surroundings, an interior surface in heat exchange relation with the interior cavity and an interior wall cavity at least a portion of which extends between the interior and exterior heat conductive wall surfaces, said interior wall cavity being configured so as to be excluded from fluid communication with the probe's surroundings;
   a sensor mounted in the interior wall cavity and surrounded by packing comprising an electrical insulator material and configured to electrically insulate the sensor from the surrounding interior wall cavity and securely hold the sensor in place in the interior wall cavity, to prevent relative movement of the sensor in relation to the interior wall cavity, said sensor comprising:
   a substrate; and
   a temperature sensing element mounted on said substrate and including a material whose electrical resistance varies with temperature;
   a contact for placing the sensor in electrical communication with a measuring device for measuring changes in electrical resistance of the temperature sensing element; and
   a support casing mated to one end of the tip casing, at least that portion of the supporting casing adjacent the tip casing comprising a material having a thermal conductivity lower than the thermal conductivity of the heat conductive wall or walls of the tip casing.

15. A temperature probe for measuring the temperature of a fluid medium surrounding the probe comprising:
   a tip casing comprising a metallic generally elongated generally cylindrical casing having an interior casing cavity, the interior surface of said casing cavity being in fluid communication with the fluid medium and said cylindrical casing having a plurality of transverse holes to facilitate fluid communication between the casing cavity and the probe's surroundings and cylindrical casing further having at least one interior wall cavity having at least a portion of one wall in common with the interior casing cavity, said common wall being configured to facilitate heat transfer between the two cavities while prohibiting fluid communication between the two cavities;
   a sensor located generally along the center of the interior wall cavity and surrounded by sufficient packing comprising an electrical insulating material to substantially fill any void space remaining in the interior wall cavity and thereby electrically insulate the sensor from the tip casing, and physically secure the sensor within the interior wall cavity, said sensor comprising:
   a generally elongated support; and
   a sensing element wire wound around at least a portion of the elongated support and having a variable electrical resistance with temperature;
   a support casing comprising a second generally cylindrical casing mated to one end of the tip casing, said second generally cylindrical casing being made of a material having a thermal conductivity higher than that of the metal in the tip casing, and having a cavity running generally parallel to and along the length of the support casing, said cavity having a minimum diameter sufficient to accommodate a plurality of wires; and
   at least one wire passing through the support casing cavity and being attached at one end to the sensor and at the other end to a measuring device for measuring the sensing element wire's variation in electrical resistance in response to changes in the temperature of the probe's surroundings.

16. A temperature probe comprising:
   a hollow thermally conductive tip portion having a hollow interior portion in fluid communication with the probe surroundings and forming one end of the probe and the other end being formed from a support portion, the body of the tip portion also defining a sensor cavity which is positioned in an outer wall of the tip portion so as to be between the hollow interior of said tip portion and the exterior surface of said tip portion;
   a sensor positioned within said sensor cavity, said sensor comprising a resistance temperature detector; and
   a refractory packing material packed into sensor cavity to electrically insulate the sensor from the body of the tip portion and secure the sensor within the sensor cavity.

17. A temperature probe for measuring the temperature of the probe's surroundings comprising:
   a tip casing having an interior casing cavity in thermal communication with the probe's surroundings and at least one interior wall cavity located with respect to the interior casing cavity to facilitate heat transfer between the two cavities;
   a sensor mounted in the interior wall cavity and surrounded by sufficient packing to electrically insulate the sensor from the tip casing wall, said sensor comprising a temperature sensing element;

a contact for placing the sensor in communication with a measuring device for measuring the sensing element's response to changes in temperature of the probe's surroundings; and a support casing mated to one end of the tip casing, at least that portion of the support casing adjacent the tip casing having an effective thermal conductivity lower than that of the tip casing and said support casing being equipped with at least one fin configured to facilitate heat transfer from the support casing to a heat sink, said fin being located at a point near a seal mounted on the support casing and between the tip casing and the seal.

18. A temperature probe for measuring the temperature of the probe's surroundings comprising:

a tip casing having an exterior wall, an interior casing cavity in thermal communication with the probe's surroundings and at least one interior wall cavity located within the exterior wall, the interior wall cavity being also located with respect to the interior casing cavity to facilitate heat transfer between the two cavities;

a sensor mounted in the interior wall cavity and surrounded by sufficient packing to electrically insulate the sensor from the tip casing exterior wall, said sensor comprising a temperature sensing element;

a contact for placing the sensor in communication with a measuring device for measuring the sensing element's response to changes in temperature of the probe's surroundings; and a support casing mated to one end of the tip casing, at least that portion of the support casing adjacent the tip casing having an effective thermal conductivity lower than that of the tip casing, said support casing being equipped with at least one fin configured to facilitate heat transfer from the support casing to a heat sink.

19. A temperature probe according to claim 18 wherein a seal is mounted on the support casing and at least one fin is located at a point near the seal and between the tip casing and the seal.

* * * * *